(12) United States Patent
Liu

(10) Patent No.: US 7,725,516 B2
(45) Date of Patent: May 25, 2010

(54) FAST DCT ALGORITHM FOR DSP WITH VLIW ARCHITECTURE

(75) Inventor: Shizhong Liu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1106 days.

(21) Appl. No.: 11/377,134

(22) Filed: Mar. 15, 2006

(65) Prior Publication Data

US 2007/0078921 A1 Apr. 5, 2007

Related U.S. Application Data

(60) Provisional application No. 60/724,131, filed on Oct. 5, 2005.

(51) Int. Cl.
*G06F 17/14* (2006.01)
(52) U.S. Cl. .................................... 708/402
(58) Field of Classification Search .................. None
See application file for complete search history.

(56) References Cited

U.S. PATENT DOCUMENTS

| 5,826,054 A * | 10/1998 | Jacobs et al. ............... 712/213 |
| 5,943,502 A * | 8/1999 | Sariel et al. .................... 712/16 |
| 6,397,235 B1 * | 5/2002 | Van Eijndhoven et al. .. 708/401 |
| 6,754,687 B1 * | 6/2004 | Kurak et al. ................. 708/402 |
| 6,804,771 B1 * | 10/2004 | Jung et al. ................... 712/220 |
| 2004/0267857 A1 * | 12/2004 | Abel et al. ................... 708/524 |

FOREIGN PATENT DOCUMENTS

WO 0135267 5/2001

OTHER PUBLICATIONS

International Search Report—PCT/US06/039279—International Search Authority, European Patent Office—Jun. 25, 2008.
Written Opinion—PCT/US06/039279—International Search Authority, European Patent Office—Jun. 25, 2008.
Wanli Ouyang, et al., "Practical fast asymmetric DCT algorithm and its SIMD and VILIW oriented architecture,"Proceedings of 2005 IEEE International Workshop on Inteligent Signal Processing (WISP 2005), Sep. 1-3, 2005, Faro, Portugal, Sep. 1, 2005, pp. 28-31.
Li Ji, et al., "New DCT Computation algorithm for VLIW architecture," Proceedings of 2002 International Conference on Signal Processing (ISCP '02), Aug. 26-30, 2002, Beijing, China, vol. 1, Aug. 26, 2002, pp. 41-44.

(Continued)

*Primary Examiner*—David H Malzahn
(74) *Attorney, Agent, or Firm*—Timothy F. Loomis; John Rickenbrode

(57) ABSTRACT

A single stage computation method to perform a discrete cosine transform operation is provided. The discrete cosine transform operation is performed by executing a plurality of very large instruction words (VLIW) using a digital signal processor. The plurality of very large instruction words includes a first number of multiplications and a second number of additions, where the first number of multiplications is greater than the second number of additions.

25 Claims, 8 Drawing Sheets

OTHER PUBLICATIONS

Sohm O.P., et al., "Fast 2D-DCT implementation for VLIW processors," Proceedings of 1999 IEEE Workshop on Multimedia Signal Processing, Sep. 13-15, 1999, Copenhagen, Denmark, 1999, pp. 655-660.

Loeffler C., et al., "Practical fast 1-D DCT algorithms with 11 multiplications," Proceedings of 1989 IEEE International Conference on Acoustics, Speech & Signal Processing (ICASSP '89), May 23-26, 1989, Glasgow, UK, vol. 2, May 23, 1989, pp. 988-991.

Bagni D., et al., "Efficient IDCT implementations on VLIW processors," Proceedings of the 2002 European Signal Processing conference (EUSIPCO'2002), Sep. 3-6, 2002, Toulouse, Sep. 3, 2002.

* cited by examiner

FAST DCT ALGORITHM FOR DSP WITH VLIW ARCHITECTURE

This application claims the benefit of U.S. Provisional Application No. 60/724,131, filed Oct. 5, 2005, the entire content of which is incorporated herein by reference.

BACKGROUND

I. Field

The present disclosure generally relates to discrete cosine transforms using digital signal processors. More particularly, the disclosure relates to a system and method of single stage discrete cosine transforms for VLIW-based digital signal processors.

II. Description of Related Art

Conventionally, digital signal processors (DSPs) often utilize very long instruction word (VLIW) architectures. A VLIW-based DSP can perform multiple operations within a single clock cycle. For example, a VLIW-based DSP can perform multiply-accumulate (MAC), Arithmetic Logic Unit (ALU), and memory load/store operations in a single cycle. The computing power of such DSPs makes it possible to implement a DSP-based multimedia system, which offers great flexibility and cost effectiveness.

A discrete cosine transform (DCT) is a mathematical operation that can be performed on a signal to convert the signal from the time domain to the frequency domain for further processing. The DCT has become a core technology in both still image and video compression standards, including Joint Photographic Experts Group (JPEG) lossy compression, Moving Picture Experts Group (MPEG) standards 1, 2 and 4, and the like.

Advances in technology have resulted in smaller and more powerful personal computing devices, many of which provide image and/or video capabilities. For example, there currently exist a variety of portable personal computing devices, including wireless computing devices, such as portable wireless telephones, personal digital assistants (PDAs), and paging devices that are small, lightweight, and easily carried by users. Many of such portable personal computing devices include a digital still camera, a digital video camera, a digital recorder, an audio file player, or any combination thereof. Additionally, a portable personal computing device can include a web interface that can be used to access the Internet. Consequently, many of the portable personal computing devices include DSPs.

To improve system performance and to save DSP cycles for use in other processes, various fast algorithms have been proposed to compute the DCT more efficiently by exploiting symmetric properties of the DCT. Conventionally, such fast algorithms have focused on reducing the number of multiplications under the assumption that multiplication takes longer than addition in the core processor. However, the assumption is no longer true for modern DSP architectures with single cycle multiplication instructions. Furthermore, existing DCT algorithms often include multiple stages that inhibit exploitation of the DSPs capabilities due to data dependency between stages.

Accordingly, it would be advantageous to provide an improved DCT algorithm for in a VLIW-based DSP.

SUMMARY

In a particular embodiment, a single stage computation method to perform a discrete cosine transform operation is provided. The discrete cosine transform operation is performed by executing a plurality of very large instruction words (VLIW) using a digital signal processor. The plurality of very large instruction words includes a first number of multiplications and a second number of additions, where the first number of multiplications is greater than the second number of additions.

In one particular embodiment, the discrete cosine transform operation is performed on an eight point data set. In another particular embodiment, the discrete cosine transform operation is performed on an eight by eight point matrix data set. In another particular embodiment, the plurality of VLIW instructions are without data dependencies such that the discrete cosine transform can be performed in a single stage of execution. In yet another embodiment, the discrete cosine transform operation includes applying a one-dimensional eight-point DCT transform operation to each column of an input matrix data set to produce an intermediate matrix, and applying the one-dimensional eight-point DCT transform to each row of the intermediate matrix to produce a transformed matrix data set. In another particular embodiment, the first number of multiplications includes 30 multiplication operations and the second number of additions includes up to 12 additions.

In another particular embodiment, a method to perform a discrete cosine transform operation is provided. An input data set is received. The input data set is processed by executing a plurality of very large instruction words to perform a single-stage discrete cosine transform operation on the input data set to produce a transformed data set. In another particular embodiment, processing the input data set includes calculating a plurality of scalars related to the input data set, multiplying the plurality of scalars with a kernel matrix to produce a plurality of products, and summing the plurality of products to produce the transformed data set.

In yet another particular embodiment, the plurality of very large instruction words includes a first number of multiplications and a second number of additions and wherein the first number is greater than the second number. In another particular embodiment, the input data set is an eight point data set. In another particular embodiment, the input data set is an eight by eight matrix data set.

In still another embodiment, a communications device includes a memory and a digital signal processor. The memory is adapted to store a set of very large instruction words to execute a single stage discrete cosine transform operation. The digital signal processor is adapted to execute the set of very large instruction words to produce a transformed data set from an input data set.

In a particular embodiment, the digital signal processor is adapted to perform two multiply-accumulate operations, an arithmetic logic unit operation, and a memory load/store operation in a single clock cycle. In another particular embodiment, the digital signal processor is adapted to process images compressed according to a Joint Photographic Experts Group (JPEG) format. In another particular embodiment, the digital signal processor is adapted to process video compressed according to a moving picture experts group (MPEG) format. In another particular embodiment, the digital signal processor performs an 8×8 transform in less than 300 clock cycles.

In a particular embodiment, the communications device is a mobile telephone. In another particular embodiment, the communications device comprises a voice over Internet protocol (VoIP) phone.

In a particular embodiment, a digital signal processor includes an instruction set of very large instruction words and a processor. The instruction set of very large instruction words (VLIW) is adapted to execute a discrete cosine transform (DCT) operation having more multiply operations than addition operations. The processor is adapted to execute the instruction set to perform the DCT operation on an input data set to produce a transform data set.

In another particular embodiment, the processor executes the instruction set in a single stage. In another particular embodiment, the DCT operation includes a first number of multiply operations and a second number of addition operations, where the first number of multiply operations is twice as large as the second number of additional operations. In still another embodiment, the input data set comprises an 8×8 matrix data set.

In a particular embodiment, a communications system includes means for storing a set of instruction, the set of instructions comprising a plurality of very large instruction words (VLIWs) defining a discrete cosine transform (DCT) operation, means for receiving an input data set, and means for performing the discrete cosine transform operation by executing the plurality of very large instruction words (VLIW) on the input data set, where the plurality of very large instruction words includes a first number of multiplications and a second number of additions and wherein the first number is greater than the second number.

In another particular embodiment, a single stage computation method to perform a discrete cosine transform operation is provided. A plurality of very large instruction words (VLIW) is broken into a plurality of basic instructions to execute a discrete cosine transform (DCT) operation. At least two of the plurality of basic instructions are executed concurrently to perform a discrete cosine transform (DCT) operation on the input data set in a single stage. A transform data set is generated that is related to performance of the DCT operation on the input data set.

Further, in a particular embodiment, the plurality of very large instruction words includes a first number of multiplications and a second number of additions, where the first number of multiplications is at least twice as large as the second number of additions.

An advantage of one or more embodiments disclosed herein can include performing a discrete cosine transform (DCT) operation in a single stage.

Another advantage of one or more embodiments disclosed herein can include performing a discrete cosine transform (DCT) operation in a processor in fewer than half of the clock cycles of a conventional four-stage DCT operation.

Yet another advantage of one or more embodiments disclosed herein can include performing a discrete cosine transform (DCT) operation without data dependence between stages of the transform operation.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

Figure 1:
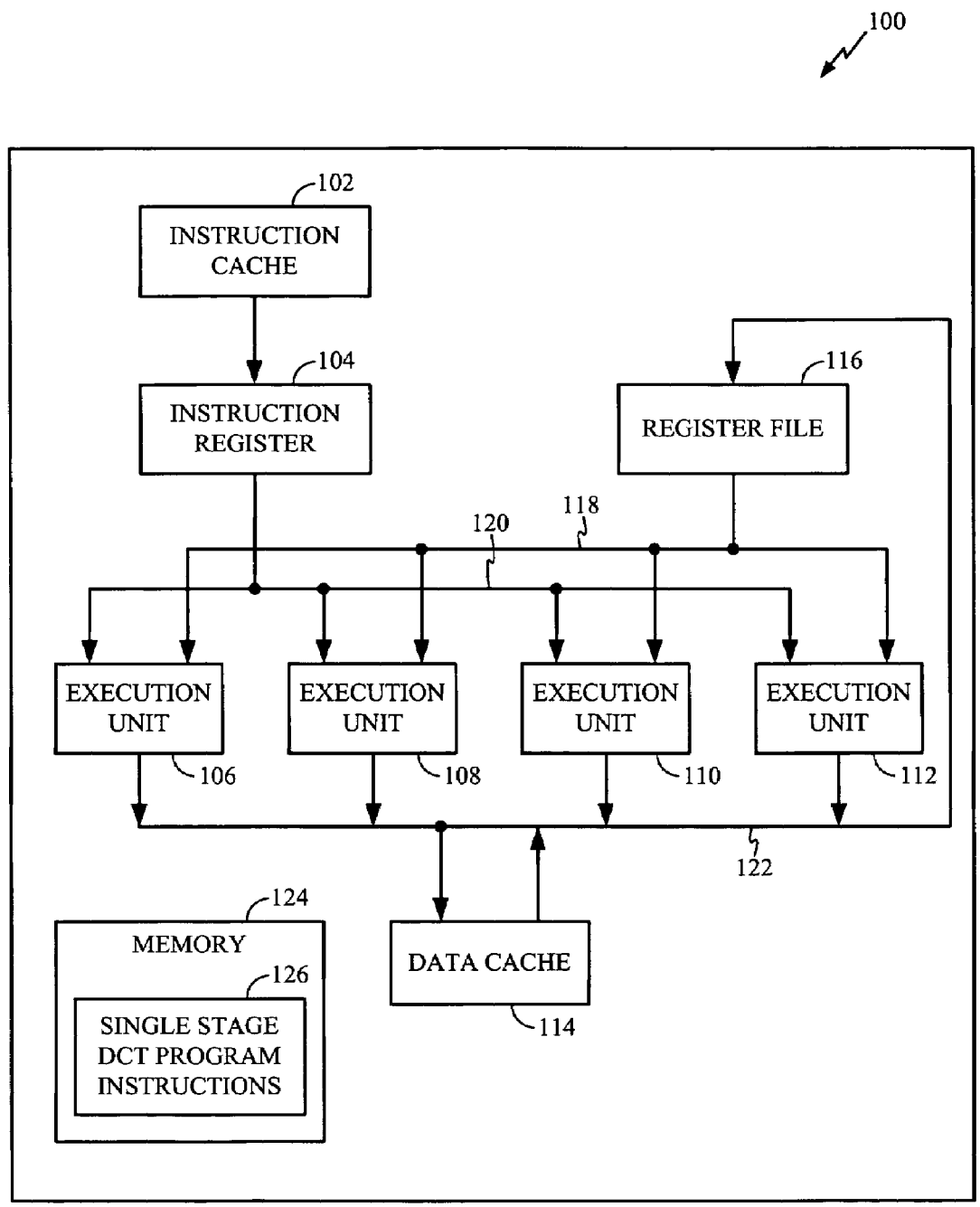
FIG. 1 is block diagram illustrating a very long instruction word (VLIW) digital signal processor (DSP) adapted to perform a single stage discrete cosine transform (DCT) operation on a signal.

FIG. 1 is block diagram illustrating a very long instruction word (VLIW) digital signal processor (DSP) 100 adapted to perform a single stage discrete cosine transform (DCT) operation. The VLIW DSP 100 includes an instruction cache 102, an instruction register 104, execution units 106, 108, 110, 112, a data cache 114, and a register file 116. The instruction cache 102 is connected to the instruction register 104 to load instructions from the cache 102 to the instruction register 104. The instruction register 104 is connected to the execution units 106, 108, 110, and 112 via a bus 120. The execution units 106, 108, 110, and 112 are connected to the data cache 114 and to the register file 116 via a bus 122.

The VLIW DSP 100 also includes a memory 124 that includes a set of program instructions 126 for a single stage DCT operation. While the memory 124 is shown as part of the processor 100, it should be understood that the memory 124 may be implemented as a system memory separate from the VLIW DSP 100 and coupled to the VLIW DSP 100 via a system bus.

The VLIW DSP 100 is adapted to receive very large instruction words, which are words containing multiple instructions. The VLIW DSP 100 may include a pre-processor (not shown) that breaks down the received VLIWs into basic operations that can be performed by the execution units 106, 108, 110 and 112 in parallel.

In general, the set of instructions 126 implement a fast DCT algorithm for digital signal processing. Instead of reducing the number of multiplications, the fast DCT algorithm utilizes the functionality of the VLIW DSP 100 to reduce the number of clock cycles by adapting the DCT algorithm to the architecture of the VLIW DSP 100. While conventional implementations of the DCT algorithm utilize multiple stages to calculate a DCT vector from a given input vector with data dependency between the stages, the set of instructions 126 provides a fast DCT algorithm that allows the DCT vector to be calculated in a single stage. This single stage DCT operation eliminates the data dependency between the multiple stages of conventional systems. Moreover, the single stage DCT operation reduces the number of clock cycles needed by the VLIW DSP 100 to perform the DCT operation.

In general, in many image compression and video compression systems, an image is divided into 8×8 data blocks. Each 8×8 data block is processed using a 2-dimensional 8×8 DCT transform operation. The 2-dimensional 8×8 DCT transform operation can be separated into two 1-dimensional 8 point DCT transform operations.

Generally, the 1-dimensional DCT transform operation can be performed using a vector multiplication process. The input vector (x) is multiplied by a DCT transform kernel matrix (C) to produce a DCT transform vector (s). Given an 8-point vector $x=[x_0\ x_1\ x_2\ x_3\ x_4\ x_5\ x_6\ x_7]^T$, a DCT transform vector $s=[s_0\ s_1\ s_2\ s_3\ s_4\ s_5\ s_6\ s_7]^T$ can be calculated using the equation (s=Cx), where the kernel matrix (C) is defined as follows:

$$C_{i,j} = \begin{cases} \sqrt{\frac{1}{8}}\cos\frac{(2j+1)i\pi}{16} & i=0,\ j=0,1,\ldots,7 \\ \sqrt{\frac{2}{8}}\cos\frac{(2j+1)i\pi}{16} & i=1,2,\ldots,7,\ j=0,1,\ldots,7 \end{cases}$$ (Equation 1)

The variable i represents a row index {i=0, 1, . . . , 7} of the kernel matrix (C), and the variable j represents a column index {i=0, 1, . . . , 7} of the kernel matrix (C). By evaluating the kernel matrix (C) for the values of i and j, the Equation 1 results in several observable symmetries:

1. For the subset of the matrix $$C_{i,j}\{i=0 \text{ and } j=0,1,\ldots,7\},\ C_{i,j}=\sqrt{\frac{1}{8}};$$

2. For the subset of the matrix $C_{i,j}$ {i=2, 6 and j=0, 1, . . . , 7}, $C_{i,j}=C_{i,(7-j)}$, and when j=0, 1, 2, or 3, $C_{i,j}=-C_{i,(3-j)}$;
3. For the subset of the matrix $C_{i,j}$ {i=4 and j=0, 1, . . . , 7}, $C_{i,j}=C_{i,(7-j)}$, and when j=0, 1, 2, or 3, $C_{i,j}=C_{i,(3-j)}$; and
4. For the subset of the matrix $C_{i,j}$ {i=1, 3, 5, 7 and j=0, 1, . . . , 7}, $C_{i,j}=-C_{i,(7-j)}$.

The observed symmetries provide a path for simplification of the DCT operation. For example, the 1-dimensional 8-point kernel matrix (C) can be simplified to make use of the observed symmetries. In particular, certain calculations may be reused within the matrix to reduce the overall number of calculations.

The kernel matrix (C) may be rewritten as follows:

$$C = \begin{bmatrix} c_{00} & c_{00} & c_{00} & c_{00} & c_{00} & c_{00} & c_{00} & c_{00} \\ c_{10} & c_{11} & c_{12} & c_{13} & -c_{13} & -c_{12} & -c_{11} & -c_{10} \\ c_{20} & c_{21} & -c_{21} & -c_{20} & -c_{20} & -c_{21} & c_{21} & c_{20} \\ c_{30} & c_{31} & c_{32} & c_{33} & -c_{33} & -c_{32} & -c_{31} & -c_{30} \\ c_{40} & c_{41} & c_{41} & c_{40} & c_{40} & c_{41} & c_{41} & c_{40} \\ c_{50} & c_{51} & c_{52} & c_{53} & -c_{53} & -c_{52} & -c_{51} & -c_{50} \\ c_{60} & c_{61} & -c_{61} & -c_{60} & -c_{60} & -c_{61} & c_{61} & c_{60} \\ c_{70} & c_{71} & c_{72} & c_{73} & -c_{73} & -c_{72} & -c_{71} & -c_{70} \end{bmatrix}$$ (Equation 2)

Using the kernel matrix (C) and the observations above, the DCT algorithm can be designed as a series of matrix operations. Given $x=[x_0\ x_1\ x_2\ x_3\ x_4\ x_5\ x_6\ x_7]^T$, a DCT transform vector $s=[s_0\ s_1\ s_2\ s_3\ s_4\ s_5\ s_6\ s_7]T$ can be calculated by multiplying the vector x with the kernel matrix (C) as follows:

$s_0=c_{00}\times x_0+c_{00}\times x_1,\ t_0=x_0-x_7$ (Equation 3)

$s_0+=c_{00}\times x_2+c_{00}\times x_3,\ t_1=x_1-x_6$ (Equation 4)

$s_0+=c_{00}\times x_4+c_{00}\times x_5,\ t_2=x_2-x_5$ (Equation 5)

$s_0+=c_{00}\times x_6+c_{00}\times x_7,\ t_3=x_3-x_4$ (Equation 6)

It should be appreciated that, for example, Equation 3 above includes a multiply-accumulate operation and a arithmetic logic unit operation, which a very long instruction word (VLIW) processor can process within a single clock cycle. With this set of calculations, the first element ($s_0$) of the resultant transform vector (s) is calculated. Additionally, a first set of scalars ($t_0$, $t_1$, $t_2$, and $t_3$) has been calculated for use in calculating the odd elements ($s_1$, $s_3$, $s_5$, $s_7$) of the resultant transform vector (s) as follows.

$s_1=c_{10}\times t_0+c_{11}\times t_1,\ t_4=x_0+x_7$ (Equation 7)

$s_1+=c_{12}\times t_2+c_{13}\times t_3,\ t_5=x_1+x_6$ (Equation 8)

$s_3=c_{30}\times t_0+c_{31}\times t_1,\ t_6=x_2+x_5$ (Equation 9)

$s_3+=c_{32}\times t_2+c_{33}\times t_3,\ t_7=x_3+x_4$ (Equation 10)

$s_5=c_{50}\times t_0+c_{51}\times t_1,\ t_8=t_4-t_7$ (Equation 11)

$s_5+=c_{52}\times t_2+c_{53}\times t_3,\ t_9=t_5-t_6$ (Equation 12)

$s_7=c_{70}\times t_0+c_{71}\times t_1,\ t_{10}=t_4+t_7$ (Equation 13)

$s_7+=c_{72}\times t_2+c_{73}\times t_3,\ t_{11}=t_5+t_6$ (Equation 14)

With this set of calculations, the odd elements ($s_1$, $s_3$, $s_5$, and $s_7$) of the resultant transform vector (s) are calculated, together with another set of scalars ($t_4$, $t_5$, $t_6$, $t_7$, $t_8$, $t_9$, $t_{10}$, and $t_{11}$). The scalars ($t_4$, $t_5$, $t_6$, and $t_7$) are based on elements of the input vector (x), while scalars ($t_8$, $t_9$, $t_{10}$, and $t_{11}$) are based on the other scalars ($t_4$ through $t_7$). This latter set of scalars ($t_8$ through $t_{11}$) can be utilized to calculate the remaining even elements ($s_2$, $s_4$, and $s_6$) of the resultant transform vector (s) as follows.

$s_2=c_{20}\times t_8+c_{21}\times t_9$ (Equation 15)

$s_4=c_{40}\times t_{10}+c_{41}\times t_{11}$ (Equation 16)

$s_6=c_{60}\times t_8+c_{61}\times t_9$ (Equation 17)

With this set of calculations, the remaining even elements ($s_2$, $s_4$, and $s_6$) of the resultant DCT vector (s) can be calculated.

As can be seen, the above set of equations can be implemented with 30 multiplication operations and up to 12 addition operations. Thus, a representative VLIW DSP can perform the above-equations in 297 clock cycles, which is less than half of the number of clock cycles required for a traditional DCT operation. Moreover, the above-equations are not data dependent, which fits the VLIW DSP architecture well.

Figure 2:
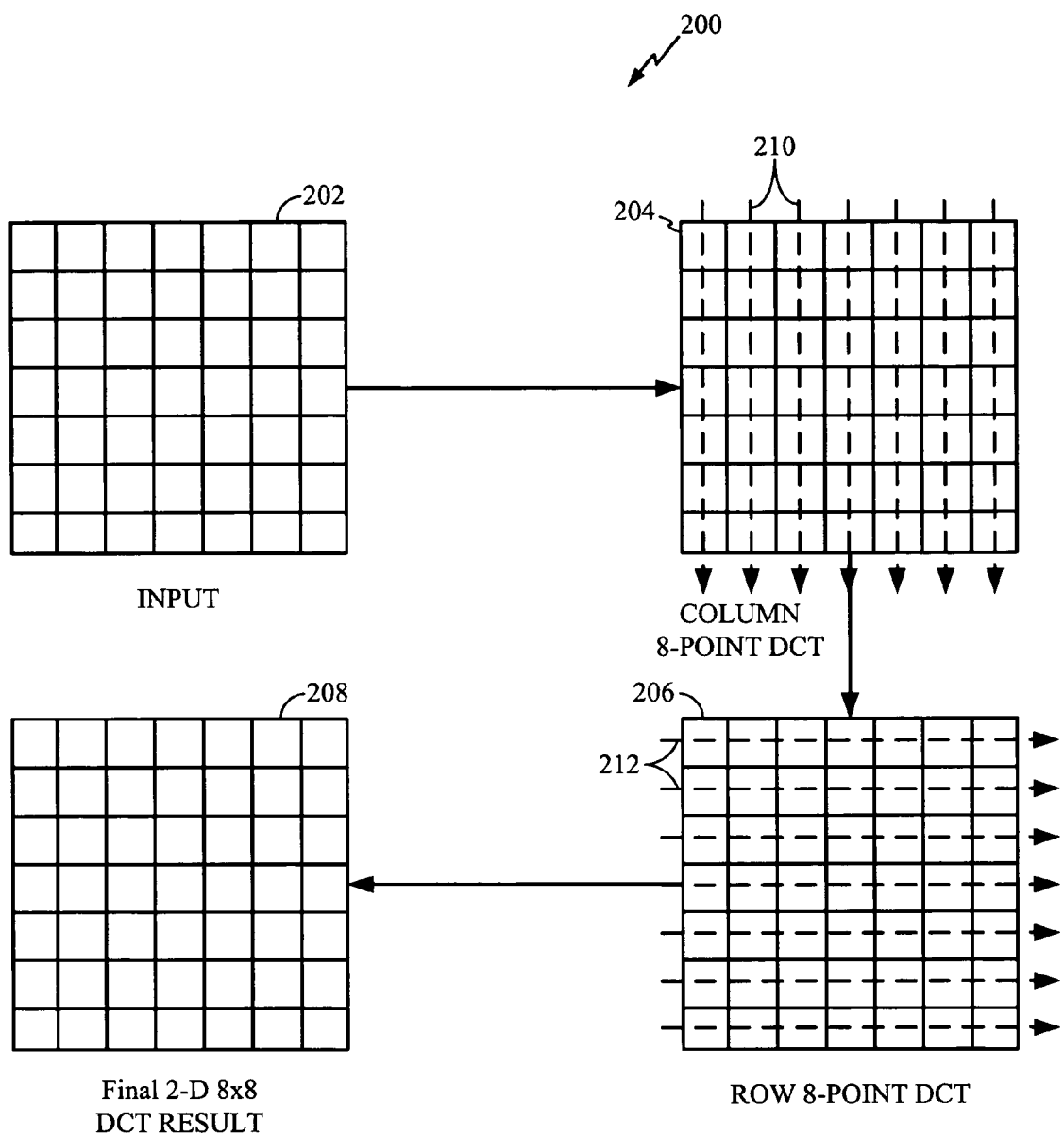
FIG. 2 is a general diagram illustrating a method of performing a discrete cosine transform (DCT) operation using a VLIW processor, such as that shown in FIG. 1.

FIG. 2 is a block diagram 200 illustrating a method of performing a discrete cosine transform (DCT) operation using a VLIW processor, such as that shown in FIG. 1. In general, a 2-dimensional 8×8 DCT transform operation can be implemented by executing two 1-dimensional 8×8 DCT transform operations. The input, indicated by block 202, is processed at block 204 by applying a 1-dimensional 8-point DCT operation to each column (as indicated by arrows 210) of the input matrix 202 to produce an intermediate matrix 206. The intermediate matrix 206 is processed by applying a 1-dimensional 8-point DCT operation to each row (as indicated by arrows 212) of the intermediate matrix 206 to produce a resultant 2-dimensional 8×8 DCT matrix 208.

Figure 3:
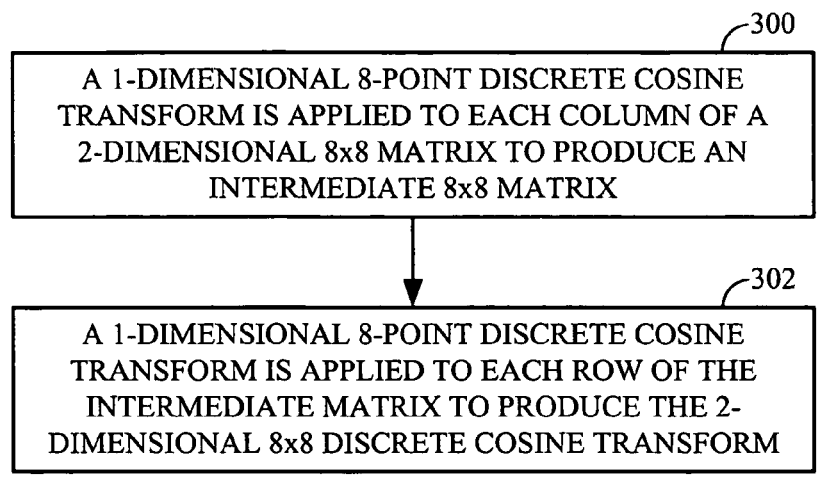
FIG. 3 is a flow diagram illustrating a method of performing a DCT operation using a VLIW processor.

FIG. 3 is a flow diagram illustrating a method of performing a DCT operation using a VLIW digital signal processor (DSP). A 1-dimensional 8-point discrete cosine transform (DCT) is applied to each column of a 2-dimensional 8×8 matrix to produce an intermediate 8×8 matrix (block 300). A 1-dimensional 8-point DCT is applied to each row of the intermediate 8×8 matrix to produce the 2-dimensional 8×8 DCT matrix (block 302).

Figure 4:
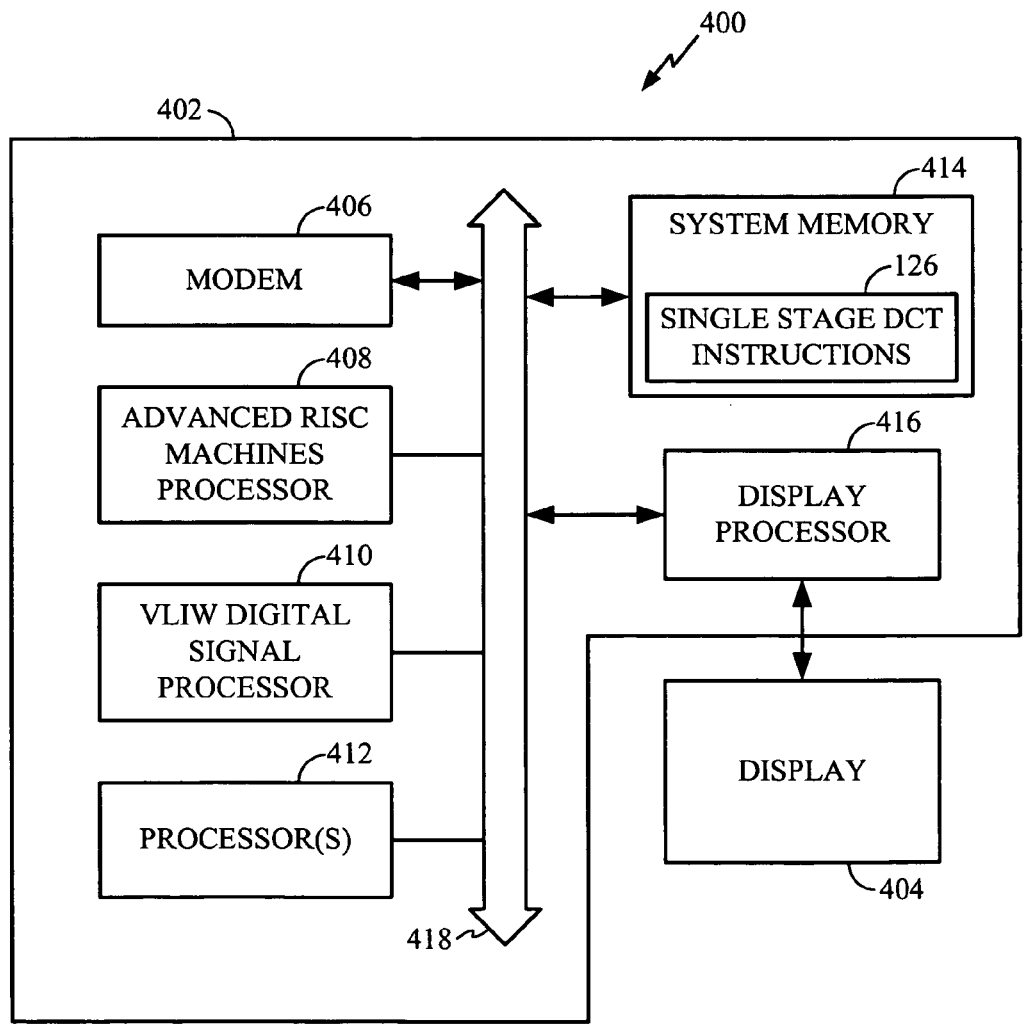
FIG. 4 is a block diagram of a communications device incorporating a VLIW digital signal processor (DSP)

FIG. 4 is a block diagram of a communications device 400 incorporating a VLIW digital signal processor (DSP). The communications device 400 includes an integrated circuit 402 coupled to a display 404. The integrated circuit 402 includes a modem 406, an advanced RISC machines processor 408, a very long instruction word (VLIW) digital signal processor (DSP) 410, one or more processors 412, a system memory 414, and a display processor 416. The modem 406, the advanced RISC machines processor 408, the VLIW DSP 410, the processors 412, the system memory 414, and the display processor 416 are coupled to one another via a bus 418. In general, the bus 418 may be coupled to one or more input interfaces, including a keypad, a universal serial bus interface, a microphone, a speaker, and various other components, which are omitted for simplicity. In this instance, the memory 414 stores single stage DCT instructions 126 for execution by the VLIW digital signal processor (DSP) 410 to perform the 2-dimensional 8×8 DCT operation, such as that described in FIGS. 2 and 3 above.

The advanced RISC machines processor 408 may be used for controlling various processes, including execution of games, coordination of graphics decoding using other processors 412, and the like. The modem 406 is a modulator/demodulator for communicating with external devices, via a communications interface (not shown) that either is connected to the bus 418 or is coupled to the modem 406. The communications device 400 may be wired or wireless, depending on the particular implementation.

In general, a video or an image is provided to the VLIW digital signal processor 410, which processes the video or the image using the processor-readable single stage DCT instructions provided from the system memory 414. The resultant decoded video or image is then provided by the VLIW digital signal processor 410 to the display processor 416 via the bus 418, which provides the decoded video or image to the display 404, which may be a liquid crystal display (LCD) for example. In one embodiment, the VLIW DSP 410 is a QDSP-4 platform chip, such as that produced by Qualcomm, Incorporated of San Diego, Calif.

The single stage DCT instructions 126 may be executed to perform the algorithm described in Equations 1-17 above. The algorithm may readily be used with other DSPs with a VLIW architecture. Moreover, the algorithm can readily be scaled according to the resources in the selected DSP. For example, if a particular DSP is capable of performing four Multiply-accumulate operations (MACs) and two arithmetic logic unit operations (ALUs) per clock cycle, the single stage DCT instructions 126 may be adapted to use this DSP architecture by merging MAC and ALU operations. While the above-equations describe an 8-point DCT operation, the algorithm and the associated equations may be scaled to other DCT transform operations, including a 16-point DCT transform. Moreover, the equations may be extended for use with the inverse DCT (IDCT) operation. In general, the processor may be adapted to perform a discrete cosine transform (DCT) operation by executing a plurality of very large instruction words (VLIW) using a digital signal processor. The plurality of VLIWs can include a first number of multiplications and a second number of additions, wherein the first number is greater than the second number.

Figure 5:
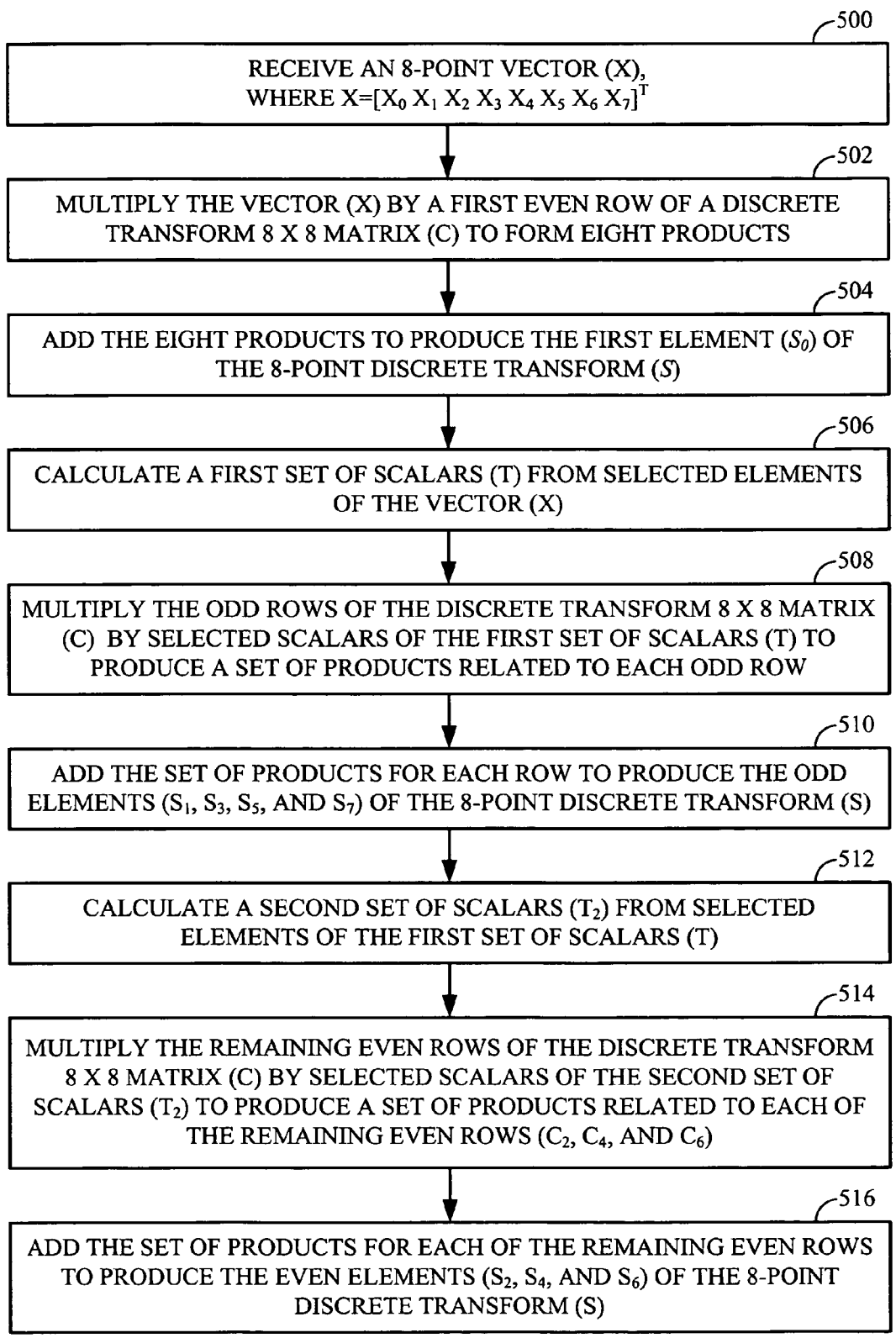
FIG. 5 is a flow diagram illustrating a method of performing a 1-Dimensional 8×8 DCT operation using a VLIW DSP, such as that shown in FIG. 4.

FIG. 5 is a flow diagram illustrating a method of performing a 1-Dimensional 8×8 DCT operation using a VLIW DSP. An 8-point vector (x) is received, where $x=[x_0\ x_1\ x_2\ x_3\ x_4\ x_5\ x_6\ x_7]^T$ (block 500). The vector (x) is multiplied by a first even row $(c_{0,j})$ of a DCT 8×8 kernel matrix (C) to form eight products (block 502). The eight products are then added together to produce the first element $(s_0)$ of the 8-point DCT vector (s) (block 504). A first set of scalars (t) are calculated from selected elements of the vector (x) (as shown in equations 3-6 above) (block 506). It should be understood that the multiply-accumulate and add operations of blocks 502, 504 and 506 may occur concurrently. Alternatively, block 506 may occur before blocks 502 and 504.

The odd rows of the DCT 8×8 matrix (C) are multiplied with selected scalars of the first set of scalars (t) to produce a set of products related to each odd row of the matrix (C) (block 508). The set of products for each row are added together to produce the odd elements $(s_1, s_3, s_5,$ and $s_7)$ of the 8-point DCT vector (s) (block 510). The second set of scalars $(t_2)$ are calculated from selected elements of the first set of scalars (t) (as shown in equations 7-14 above) (block 512). It should be understood that the multiply-accumulate and add operations of blocks 508, 510, and 512 may occur concurrently or in a different order.

The remaining even rows $(c_2, c_4,$ and $c_6)$ of the DCT 8×8 kernel matrix (C) are multiplied with selected scalars of the second set of scalars $(t_2)$ to produce a set of products related to each of the remaining even rows $(c_2, c_4,$ and $c_6)$ (block 514). The set of products are added together for each of the remaining even rows $(c_2, c_4,$ and $c_6)$ to produce the even elements $(s_2, s_4,$ and $s_6)$ of the 8-point DCT vector (s) (block 516).

In general, the above-described discrete cosine transform (DCT) operation can be adapted to operate in a single stage DSP. Instead of simplifying the algorithm to include more add operations than multiply operations, the algorithm has 30 multiply operation sand only 12 additions. Moreover, the 8-point DCT operation can reduce the number of clock cycles required for an 8×8 DCT transform on a VLIW DSP to only 297 cycles, from 599 cycles required for conventional DCT decoding operations, such as that described by C. Loeffler et al., "Practical Fast 1-D DCT algorithm with 11 multiplications," IEEE Transactions on Acoustics, Speech and Signal Processing, (1989) ICASSP-89, Vol. 2, pp. 988-991. The single stage DCT operation described in equations 4-17 above provides more than 50% improvement in terms of the number of clock cycles required to perform a DCT operation, improving JPEG encoding/decoding latency and DCT-based video encoding/decoding performance.

Figure 6:
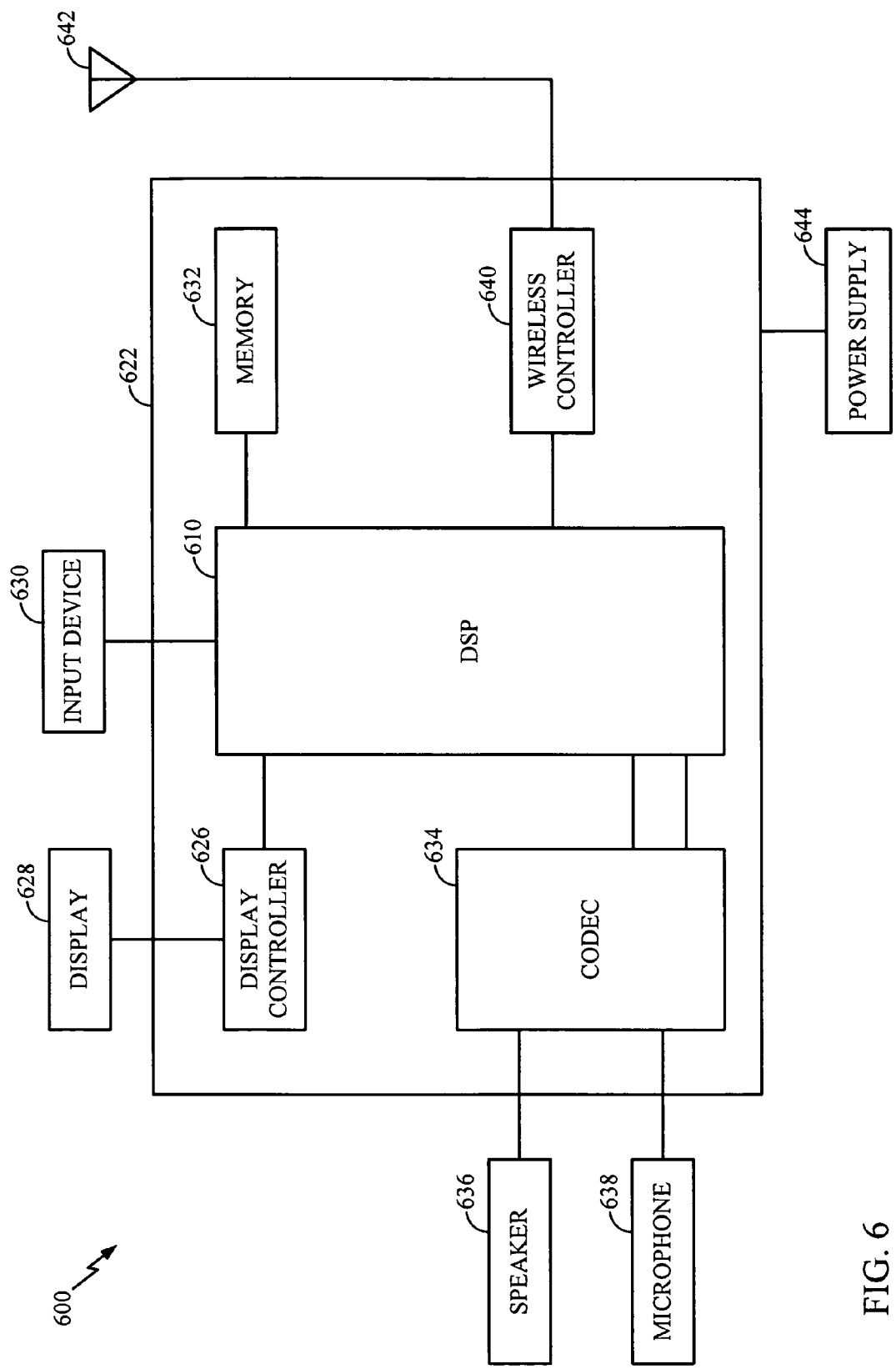
FIG. 6 is a general diagram of a portable communication device incorporating a digital signal processor.

FIG. 6 illustrates an exemplary, non-limiting embodiment of a portable communication device that is generally designated 600. As illustrated in FIG. 6, the portable communication device includes an on-chip system 622 that includes a digital signal processor 610. In a particular embodiment, the digital signal processor 610 is a VLIW digital signal processor, such as that shown in FIG. 1 and described herein. FIG. 6 also shows a display controller 626 that is coupled to the digital signal processor 610 and a display 628. Moreover, an input device 630 is coupled to the digital signal processor 610. As shown, a memory 632 is coupled to the digital signal processor 610. Additionally, a coder/decoder (CODEC) 634 can be coupled to the digital signal processor 610. A speaker 636 and a microphone 638 can be coupled to the CODEC 630.

FIG. 6 also indicates that a wireless controller 640 can be coupled to the digital signal processor 610 and a wireless antenna 642. In a particular embodiment, a power supply 644 is coupled to the on-chip system 622. Moreover, in a particular embodiment, as illustrated in FIG. 6, the display 628, the input device 630, the speaker 636, the microphone 638, the wireless antenna 642, and the power supply 644 are external to the on-chip system 622. However, each is coupled to a component of the on-chip system 622.

In a particular embodiment, the digital signal processor 610 may process instructions associated with programs necessary to perform the functionality and operations needed by the various components of the portable communication device 600. For example, when a wireless communication session is established via the wireless antenna a user can speak into the microphone 638. Electronic signals representing the user's voice can be sent to the CODEC 634 to be encoded. The digital signal processor 610 can perform data processing for the CODEC 634 to encode the electronic signals from the microphone. Further, incoming signals received via the wireless antenna 642 can be sent to the CODEC 634 by the wireless controller 640 to be decoded and sent to the speaker 636. The digital signal processor 610 can also perform the data processing for the CODEC 634 when decoding the signal received via the wireless antenna 642.

Further, before, during, or after the wireless communication session, the digital signal processor 610 can process inputs that are received from the input device 630. For example, during the wireless communication session, a user may be using the input device 630 and the display 628 to surf the Internet via a web browser that is embedded within the memory 632 of the portable communication device 600. Many of the instructions associated with a program may be executed concurrently during one or more clock cycles. The DSP 610 may be utilized to perform a single stage discrete cosine transform operation.

Figure 7:
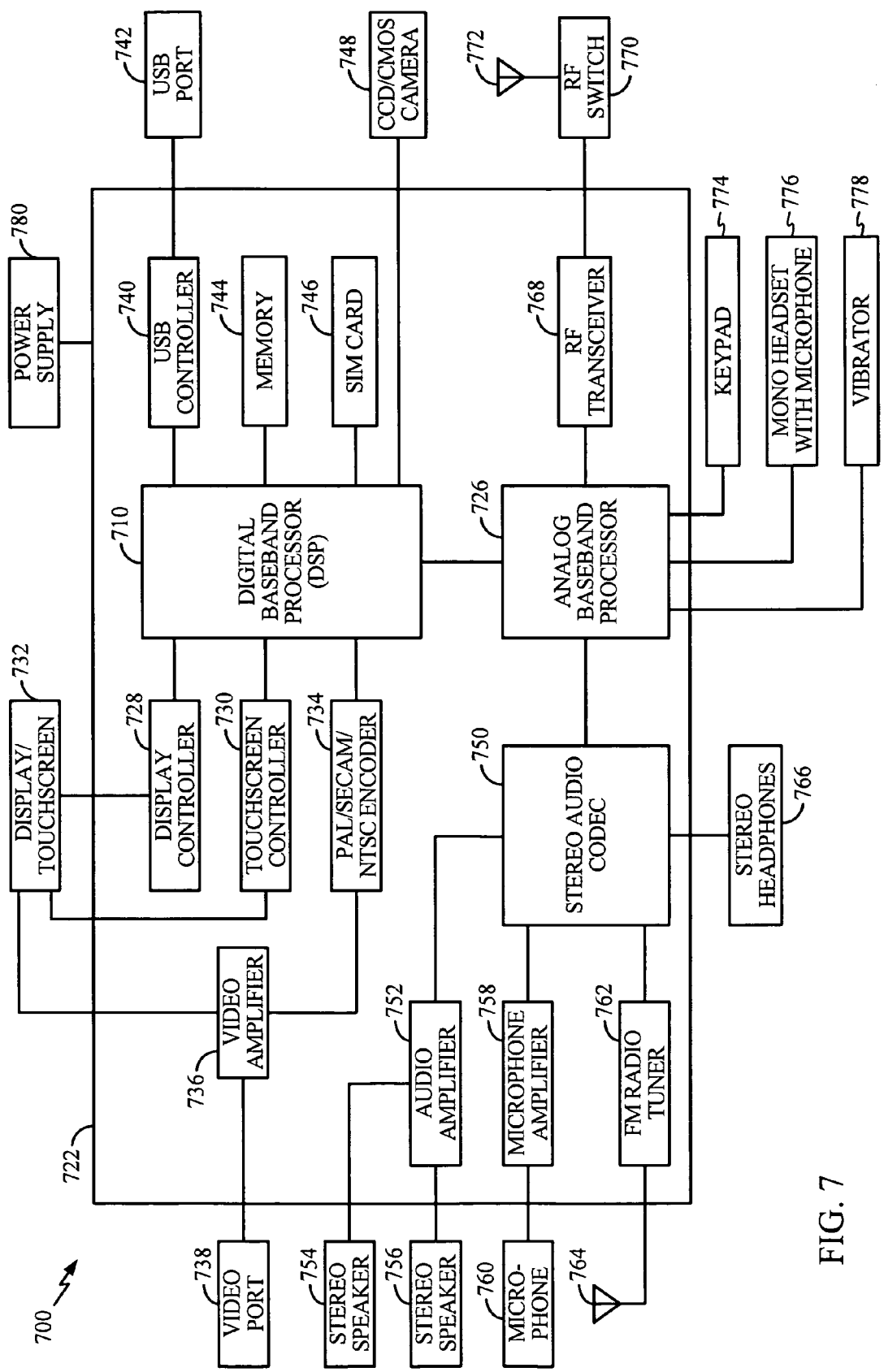
FIG. 7 is a general diagram of an exemplary wireless telephone incorporating a digital signal processor.

Referring to FIG. 7, an exemplary, non-limiting embodiment of a wireless telephone is shown and is generally designated 700. As shown, the wireless telephone 700 includes an on-chip system 722 that includes a digital baseband processor 710 and an analog baseband processor 726 that are coupled together. In a particular embodiment, the digital baseband processor 710 is a VLIW digital signal processor, such as that shown in FIG. 1 and described herein. As illustrated in FIG. 7, a display controller 728 and a touchscreen controller 730 are coupled to the digital baseband processor 710. In turn, a touchscreen display 732 external to the on-chip system 722 is coupled to the display controller 728 and the touchscreen controller 730.

FIG. 7 further indicates that a video encoder 734, e.g., a phase alternating line (PAL) encoder, a sequential couleur a memoire (SECAM) encoder, or a national television system(s) committee (NTSC) encoder, is coupled to the digital baseband processor 710. Further, a video amplifier 736 is coupled to the video encoder 734 and the touchscreen display 732. Also, a video port 738 is coupled to the video amplifier 736. As depicted in FIG. 7, a universal serial bus (USB) controller 740 is coupled to the digital baseband processor 710. Also, a USB port 742 is coupled to the USB controller 740. A memory 744 and a subscriber identity module (SIM) card 746 can also be coupled to the digital baseband processor 710. Further, as shown in FIG. 7, a digital camera 748 can be coupled to the digital baseband processor 710. In an exemplary embodiment, the digital camera 748 is a charge-coupled device (CCD) camera or a complementary metal-oxide semiconductor (CMOS) camera.

As further illustrated in FIG. 7, a stereo audio CODEC 780 can be coupled to the analog baseband processor 726. Moreover, an audio amplifier 782 can coupled to the to the stereo audio CODEC 780. In an exemplary embodiment, a first stereo speaker 784 and a second stereo speaker 786 are coupled to the audio amplifier 782. FIG. 7 shows that a microphone amplifier 788 can be also coupled to the stereo audio CODEC 780. Additionally, a microphone 760 can be coupled to the microphone amplifier 788. In a particular embodiment, a frequency modulation (FM) radio tuner 762 can be coupled to the stereo audio CODEC 780. Also, an FM antenna 764 is coupled to the FM radio tuner 762. Further, stereo headphones 766 can be coupled to the stereo audio CODEC 780.

FIG. 7 further indicates that a radio frequency (RF) transceiver 768 can be coupled to the analog baseband processor 726. An RF switch 770 can be coupled to the RF transceiver 768 and an RF antenna 772. As shown in FIG. 7, a keypad 774 can be coupled to the analog baseband processor 726. Also, a mono headset with a microphone 776 can be coupled to the analog baseband processor 726. Further, a vibrator device 778 can be coupled to the analog baseband processor 726. FIG. 7 also shows that a power supply 780 can be coupled to the on-chip system 722. In a particular embodiment, the power supply 780 is a direct current (DC) power supply that provides power to the various components of the wireless telephone 700 that require power. Further, in a particular embodiment, the power supply is a rechargeable DC battery or a DC power supply that is derived from an alternating current (AC) to DC transformer that is connected to an AC power source.

In a particular embodiment, as depicted in FIG. 7, the touchscreen display 732, the video port 738, the USB port 742, the camera 748, the first stereo speaker 784, the second stereo speaker 786, the microphone 760, the FM antenna 764, the stereo headphones 766, the RF switch 770, the RF antenna 772, the keypad 774, the mono headset 776, the vibrator 778, and the power supply 780 are external to the on-chip system 722. The digital baseband processor (DSP) 710 may be utilized to perform a single stage discrete cosine transform operation on a signal.

Figure 8:
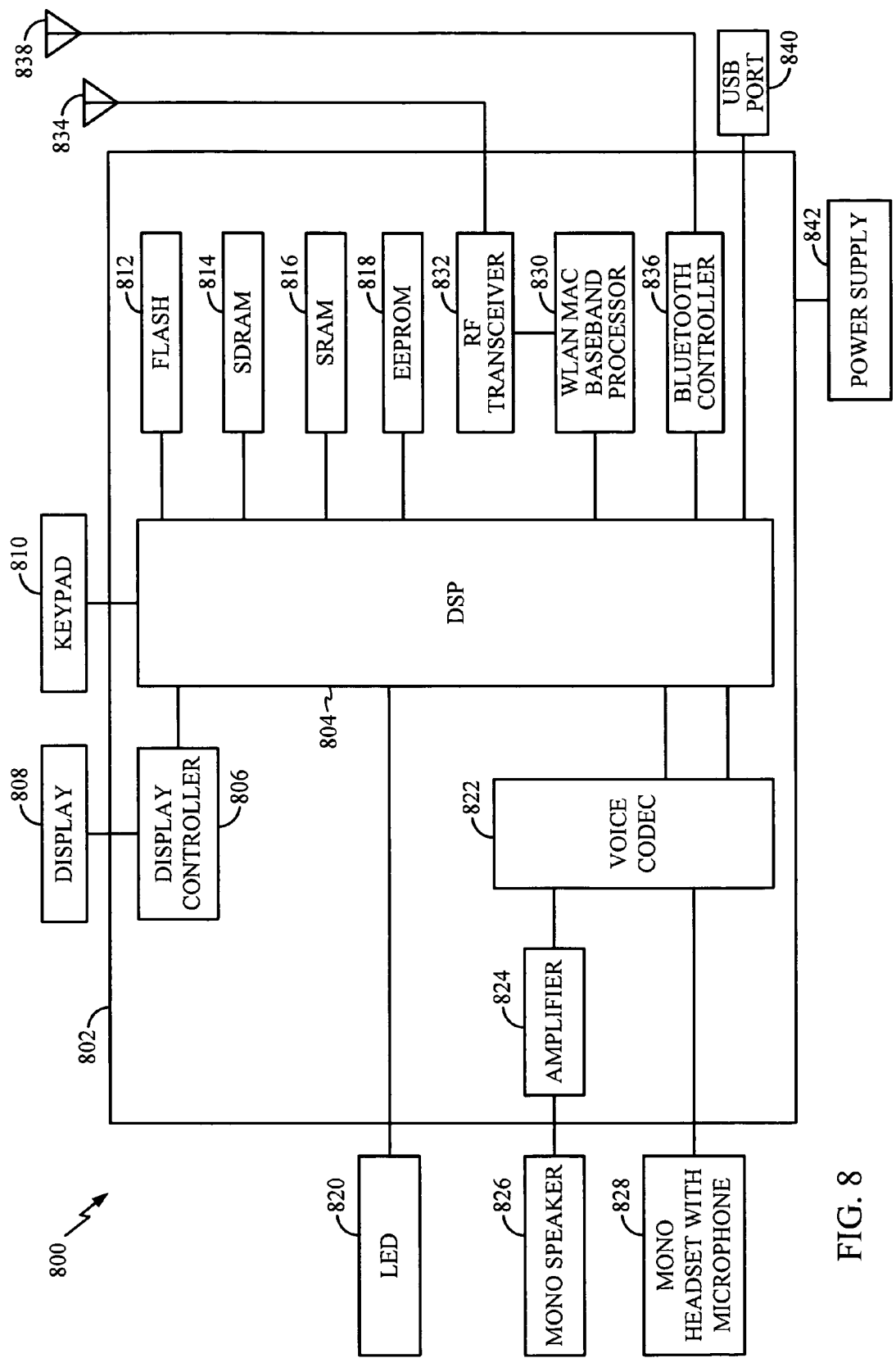
FIG. 8 is a general diagram of an exemplary wireless Internet Protocol telephone incorporating a digital signal processor.

Referring to FIG. 8, an exemplary, non-limiting embodiment of a wireless Internet protocol (IP) telephone is shown and is generally designated 800. As shown, the wireless IP telephone 800 includes an on-chip system 802 that includes a digital signal processor (DSP) 804. In a particular embodiment, the digital signal processor 804 is a VLIW digital signal processor, such as that shown in FIG. 1 and described herein. As illustrated in FIG. 8, a display controller 806 is coupled to the DSP 804 and a display 808 is coupled to the display controller 806. In an exemplary embodiment, the display 808 is a liquid crystal display (LCD). FIG. 8 further shows that a keypad 810 can be coupled to the DSP 804.

As further depicted in FIG. 8, a flash memory 812 can be coupled to the DSP 804. A synchronous dynamic random access memory (SDRAM) 814, a static random access memory (SRAM) 816, and an electrically erasable programmable read only memory (EEPROM) 818 can also be coupled to the DSP 804. FIG. 8 also shows that a light emitting diode (LED) 820 can be coupled to the DSP 804. Additionally, in a particular embodiment, a voice CODEC 822 can be coupled to the DSP 804. An amplifier 824 can be coupled to the voice CODEC 822 and a mono speaker 826 can be coupled to the amplifier 824. FIG. 8 further indicates that a mono headset 828 can also be coupled to the voice CODEC 822. In a particular embodiment, the mono headset 828 includes a microphone.

FIG. 8 also illustrates that a wireless local area network (WLAN) baseband processor 830 can be coupled to the DSP 804. An RF transceiver 832 can be coupled to the WLAN baseband processor 830 and an RF antenna 834 can be coupled to the RF transceiver 832. In a particular embodiment, a Bluetooth controller 836 can also be coupled to the DSP 804 and a Bluetooth antenna 838 can be coupled to the controller 836. FIG. 8 also shows that a USB port 840 can also be coupled to the DSP 804. Moreover, a power supply 842 is coupled to the on-chip system 802 and provides power to the various components of the wireless IP telephone 800 via the on-chip system 802.

In a particular embodiment, as indicated in FIG. 8, the display 808, the keypad 810, the LED 820, the mono speaker 826, the mono headset 828, the RF antenna 834; the Bluetooth antenna 838, the USB port 840, and the power supply 842 are external to the on-chip system 802. However, each of these components is coupled to one or more components of the on-chip system. The DSP 804 may be utilized to perform a single stage discrete cosine transform operation on a signal.

Figure 9:
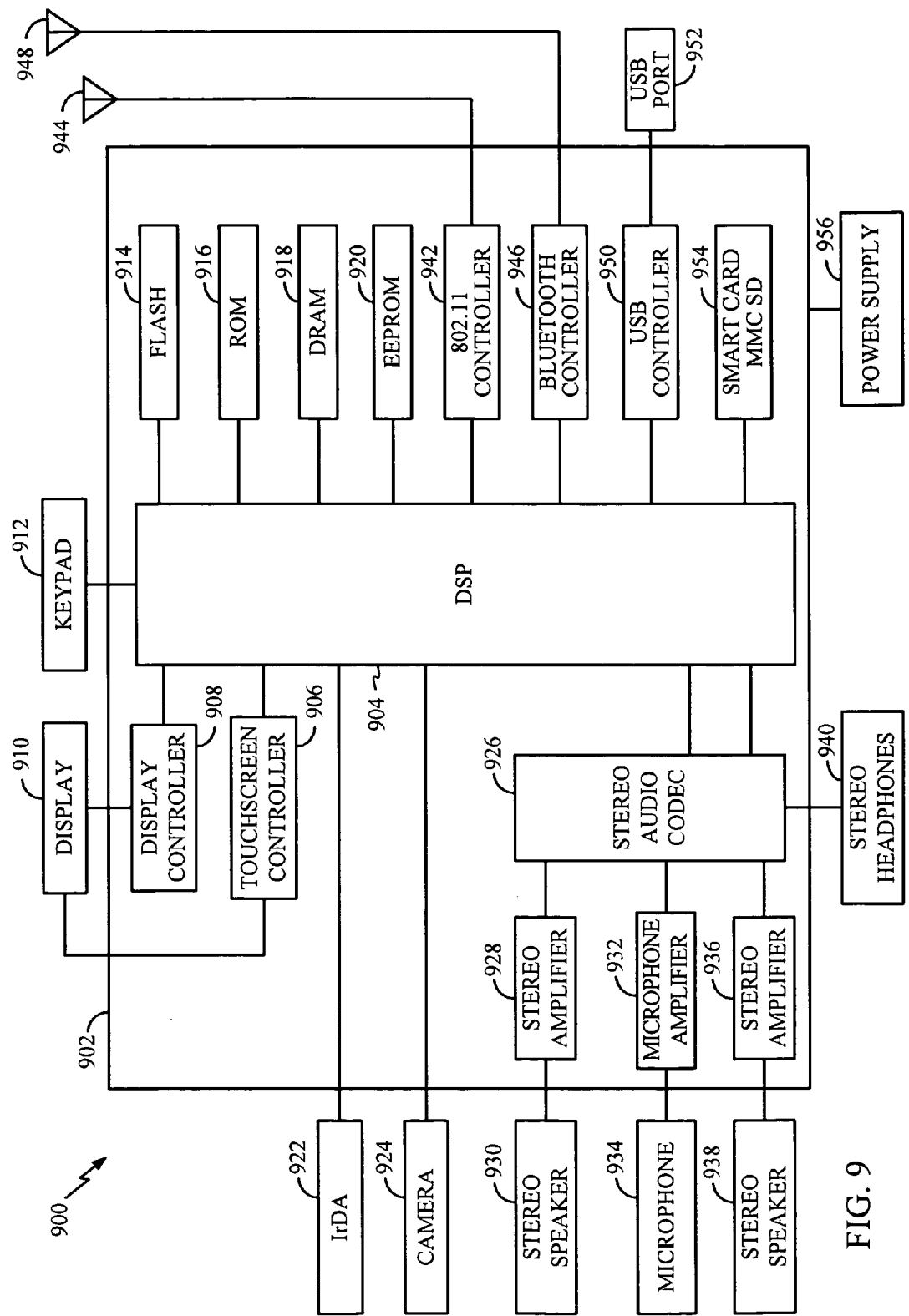
FIG. 9 is a general diagram of an exemplary portable digital assistant incorporating a digital signal processor.

FIG. 9 illustrates an exemplary, non-limiting embodiment of a portable digital assistant (PDA) that is generally designated 900. As shown, the PDA 900 includes an on-chip system 902 that includes a digital signal processor (DSP) 904. In a particular embodiment, the digital signal processor 904 is a VLIW digital signal processor, such as that shown in FIG. 1 and described herein. As depicted in FIG. 9, a touchscreen controller 906 and a display controller 908 are coupled to the DSP 904. Further, a touchscreen display is coupled to the touchscreen controller 906 and to the display controller 908. FIG. 9 also indicates that a keypad 912 can be coupled to the DSP 904.

As further depicted in FIG. 9, a flash memory 914 can be coupled to the DSP 904. Also, a read only memory (ROM) 916, a dynamic random access memory (DRAM) 918, and an electrically erasable programmable read only memory (EEPROM) 920 can be coupled to the DSP 904. FIG. 9 also shows that an infrared data association (IrDA) port 922 can be coupled to the DSP 904. Additionally, in a particular embodiment, a digital camera 924 can be coupled to the DSP 904.

As shown in FIG. 9, in a particular embodiment, a stereo audio CODEC 926 can be coupled to the DSP 904. A first stereo amplifier 928 can be coupled to the stereo audio CODEC 926 and a first stereo speaker 930 can be coupled to the first stereo amplifier 928. Additionally, a microphone amplifier 932 can be coupled to the stereo audio CODEC 926 and a microphone 934 can be coupled to the microphone amplifier 932. FIG. 9 further shows that a second stereo amplifier 936 can be coupled to the stereo audio CODEC 926 and a second stereo speaker 938 can be coupled to the second stereo amplifier 936. In a particular embodiment, stereo headphones 940 can also be coupled to the stereo audio CODEC 926.

FIG. 9 also illustrates that an 802.11 controller 942 can be coupled to the DSP 904 and an 802.11 antenna 944 can be coupled to the 802.11 controller 942. Moreover, a Bluetooth controller 946 can be coupled to the DSP 904 and a Bluetooth antenna 948 can be coupled to the Bluetooth controller 946. As depicted in FIG. 9, a USB controller 980 can be coupled to the DSP 904 and a USB port 982 can be coupled to the USB controller 980. Additionally, a smart card 984, e.g., a multimedia card (MMC) or a secure digital card (SD) can be coupled to the DSP 904. Further, as shown in FIG. 9, a power supply 986 can be coupled to the on-chip system 902 and can provide power to the various components of the PDA 900 via the on-chip system 902.

In a particular embodiment, as indicated in FIG. 9, the display 910, the keypad 912, the IrDA port 922, the digital camera 924, the first stereo speaker 930, the microphone 934, the second stereo speaker 938, the stereo headphones 940, the 802.11 antenna 944, the Bluetooth antenna 948, the USB port 982, and the power supply 980 are external to the on-chip system 902. However, each of these components is coupled to one or more components on the on-chip system. The DSP 904 may be utilized to perform a single stage discrete cosine transform operation on a signal.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A single stage computation method to perform a discrete cosine transform operation, the method comprising:
executing a plurality of very large instruction words (VLIW) using a digital signal processor to perform the discrete cosine transform on an input data set to produce a transformed data set; and
wherein the plurality of very large instruction words includes a first number of multiply accumulate operations and a second number of additions and wherein the first number of multiply accumulate operations is greater than the second number of additions.

2. The method of claim 1, wherein the discrete cosine transform operation is performed on an eight point data set.

3. The method of claim 1, wherein the discrete cosine transform operation is performed on an eight by eight point matrix data set.

4. The method of claim 1, wherein the plurality of VLIW instructions are without data dependencies such that the discrete cosine transform can be performed in a single stage of execution.

5. The method of claim 1, wherein performing the discrete cosine transform operation comprises:

applying a one-dimensional eight-point DCT transform operation to each column of an input matrix data set to produce an intermediate matrix; and applying the one-dimensional eight-point DCT transform to each row of the intermediate matrix to produce a transformed matrix data set.

6. The method of claim 1, wherein the first number of multiply-accumulate operations comprises 30 multiply-accumulate operations and wherein the second number of additions comprises 12 additions.

7. A method to perform a discrete cosine transform operation, the method comprising:

receiving, with a device, an input data set; and processing, with a processor of the device, the input data set by executing a plurality of very large instruction words to perform at least one single-stage one-dimensional (1D) discrete cosine transform operation on the input data set to produce a transformed data set.

8. The method of claim 7, wherein processing the input data set comprises:

calculating a plurality of scalars related to the input data set;

multiplying the plurality of scalars with a kernel matrix to produce a plurality of products; and summing the plurality of products to produce the transformed data set.

9. The method of claim 7, wherein the plurality of very large instruction words includes a first number of multiply-accumulate operations and a second number of additions and wherein the first number of multiply-accumulate operations is greater than the second number of additions.

10. The method of claim 7, wherein receiving the input data set comprises receiving an eight point data set.

11. The method of claim 7, wherein receiving the input data set comprises receiving an eight by eight matrix data set.

12. A communications device comprising:

a memory to store a set of very large instruction words to execute one or more single stage one-dimensional (1D) discrete cosine transform operations; and a digital signal processor adapted to execute the set of very large instruction words to produce a transformed data set from an input data set.

13. The communications device of claim 12, wherein the digital signal processor is adapted to perform two multiply-accumulate operations, an arithmetic logic unit operation, and a memory load/store operation in a single clock cycle.

14. The communications device of claim 12, wherein the digital signal processor is adapted to process images compressed according to a Joint Photographic Experts Group (JPEG) format.

15. The communications device of claim 12, wherein the digital signal processor is adapted to process video compressed according to a moving picture experts group (MPEG) format.

16. The communications device of claim 12, wherein the digital signal processor performs an 8×8 transform in less than 300 clock cycles.

17. The communications device of claim 12, wherein the communications device comprises a mobile telephone.

18. The communications device of claim 12, wherein the communications device comprises a voice over Internet protocol (VoIP) phone.

19. A digital signal processor comprising:

an instruction set of very large instruction words (VLIW) to execute a discrete cosine transform (DCT) operation having more multiply operations than addition operations; and a processor adapted to execute the instruction set to perform the DCT operation on an input data set to produce a transform data set.

20. The digital signal processor of claim 19, wherein the processor executes the instruction set in a single stage.

21. The digital signal processor of claim 19, wherein the DCT operation includes two times as many multiply operations as addition operations.

22. The digital signal processor of claim 19, wherein the input data set comprises an 8×8 matrix data set.

23. A communications system comprising:

means for storing a set of instruction, the set of instructions comprising a plurality of very large instruction words (VLIWs) defining a one-dimensional (1D) discrete cosine transform (DCT) operation;

means for receiving an input data set;

means for performing the 1D discrete cosine transform operation by executing the plurality of very large instruction words (VLIW) on the input data set;

wherein the plurality of very large instruction words includes a first number of multiply-accumulate operations and a second number of additions and wherein the first number is greater than the second number.

24. A single stage computation method to perform a one-dimensional (1D) discrete cosine transform (DCT) operation, the method comprising:

breaking a plurality of very large instruction words (VLIW) into a plurality of basic instructions to execute the 1D DCT operation;

executing, with a processor, at least two of the plurality of basic instructions concurrently to perform the 1D DCT operation on the input data set in a single stage; and generating, with the processor, a transform data set related to performance of the 1D DCT operation on the input data set.

25. The method of claim 24, wherein the plurality of very large instruction words includes a first number of multiply-accumulate operations and a second number of additions and wherein the first number of multiply-accumulate operations is at least twice as large as the second number of additions.

* * * * *